United States Patent [19]
Woodruff

[11] Patent Number: 5,816,452
[45] Date of Patent: Oct. 6, 1998

[54] DISPENSER GUN FOR VISCOUS OR SEMI-VISCOUS PRODUCTS

[75] Inventor: Keith F. Woodruff, Mountainside, N.J.

[73] Assignee: American Cyanamid Company, Madison, N.J.

[21] Appl. No.: 82,405

[22] Filed: Jun. 23, 1993

[51] Int. Cl.$^6$ .................................................. B67D 5/42
[52] U.S. Cl. .................... 222/287; 222/309; 222/324; 222/325; 222/378
[58] Field of Search .................... 222/131, 287, 222/309, 324, 325, 340, 341, 378, 380, 383.1; 239/333

[56] References Cited

U.S. PATENT DOCUMENTS

| | | | |
|---|---|---|---|
| 1,385,307 | 7/1921 | Condon | 222/341 X |
| 1,757,736 | 5/1930 | Pritchard | 222/340 X |
| 1,886,022 | 11/1932 | Hutton | 222/309 |
| 2,595,118 | 4/1952 | Anderson | 222/309 |
| 2,703,191 | 3/1955 | Jernander | 222/341 X |
| 3,141,583 | 7/1964 | Mapel et al. | 222/309 |
| 3,211,340 | 10/1965 | Zander et al. | 222/340 X |
| 3,517,668 | 6/1970 | Brickson | 222/309 |
| 3,545,680 | 12/1970 | Ottaway | 239/413 |
| 4,062,480 | 12/1977 | Bjorklund | 222/571 |
| 4,083,474 | 4/1978 | Waite et al. | 222/145 |
| 4,161,288 | 7/1979 | McKinney | 239/333 |
| 4,330,070 | 5/1982 | Doubleday | 222/287 X |
| 4,345,718 | 8/1982 | Horvath | 222/340 X |
| 4,394,945 | 7/1983 | Taylor, Jr. | 222/571 |
| 4,456,153 | 6/1984 | Meshberg | 222/324 X |
| 4,531,912 | 7/1985 | Schuss et al. | 222/571 |
| 4,678,107 | 7/1987 | Ennis, III | 222/571 |
| 4,809,885 | 3/1989 | Hayashi et al. | 222/571 |
| 4,821,927 | 4/1989 | Paulsen et al. | 222/340 |
| 4,923,096 | 5/1990 | Ennis, III | 222/571 |
| 4,991,747 | 2/1991 | Van Brocklin | 222/341 |
| 5,022,563 | 6/1991 | Marchitto et al. | 222/327 |
| 5,027,605 | 7/1991 | Hardesty | 222/341 X |
| 5,064,098 | 11/1991 | Hutter, III et al. | 222/137 |
| 5,065,910 | 11/1991 | Fiedler | 222/504 |
| 5,137,187 | 8/1992 | Nichols et al. | 222/504 |

*Primary Examiner*—Kenneth Bomberg
*Attorney, Agent, or Firm*—Mark P. Stone

[57] ABSTRACT

A dispenser gun for selectively dispensing controlled quantities of viscous or semi-viscous materials, and in particular liquid pesticides or insecticides, employs a vacuum driven operating system for discharging and reloading the viscous or semi-viscous materials to be discharged. The dispenser gun is designed to create pressure differentials in adjoining chambers which, in conjunction with a cooperating valve system, enables the discharge of precisely metered quantities of material and prevents continued and undesired discharge or dripping from a discharge nozzle after a preselected quantity of material has been discharged from the dispenser gun. The handle of the device includes structure for pre-selecting one or more predetermined quantities of material to be discharged from the dispenser in repeatable sequences. The dispenser gun also includes structure for removably receiving a replaceable reservoir of viscous or semi-viscous material to be discharged from the gun.

6 Claims, 3 Drawing Sheets

DISPENSER GUN FOR VISCOUS OR SEMI-VISCOUS PRODUCTS

BACKGROUND OF THE INVENTION

The present invention is directed to dispensing devices for discharging predetermined quantities of viscous or semi-viscous materials from the nozzle of a gun-like device having a manually actuated trigger structure for selectively discharging the materials from the gun. In particular, the discharge device of the present invention is primarily adapted for the application of relatively small quantities of viscous or semi-viscous liquid insecticides or pesticides to be applied to relatively small target areas in accurate and repeatable sequences.

The following United States patents represent typical prior art dispensing devices for discharging liquid materials, including viscous or semi-viscous materials: U.S. Pat. Nos. 3,141,583; 3,517,688; 3,545,680; 4,062,480; 4,083,474; 4,394,945; 4,531,912; 4,678,107; 4,809,885; 4,821,927; 4.923,096; 4,991,747; 5,022,563; 5,064,098; 5,065,910; and 5,137,187.

It is an object of the present invention to overcome disadvantages of the known prior art dispensing guns. In particular, the discharge devices encompassed within the scope of the present invention provide manually actuated dispensing guns including means for presetting selected quantities of material to be discharged from the device, and assuring that the precisely metered quantity of discharged material are applied in repeatable sequences at the selection of the user. The dispensing gun is adapted to operate as a vacuum driven system, and includes suction generating means for evacuating a discharge chamber to prevent dripping of material from the gun after the desired quantity of material has been discharged. The dispensing gun is particularly adapted to the discharge and application of viscous and semi-viscous materials, and in particular, liquid pesticides and insecticides, which, by the nature of the products, precisely measured, relatively small quantities of material are discharged and applied to well defined and closely confined target locations. It is the further object of the present invention to provide a dispensing device including means for adjusting one or more of the preset quantities of material dischargeable from the gun, and further providing means for readily enabling the user to discharge the same predetermined quantities of material from the gun in easily repeatable selected sequences.

Other objects and advantages of the present invention will become apparent from the following discussion in conjunction with the accompanying drawings.

SUMMARY OF THE INVENTION

The present invention provides a manually operated, trigger actuated gun-like dispensing device for selectively discharging predetermined quantities of material through a discharge nozzle for application of the discharged material to a predetermined target location. The dispensing device is particularly adapted to selectively discharge one or more preselected, relatively small quantities of viscous or semi-viscous material, particularly liquid insecticides or pesticides or other similar materials, in precisely metered. adjustable quantities, and in readily repeatable sequences.

The dispensing device includes a housing section for removably receiving a replaceable container holding the material to be dispensed from the device. A manually actuated, spring biased trigger is included within a handle section of the device, and means are provided for adjusting and limiting the relative movement of the trigger to discharge one or more different predetermined quantities of material from a forward discharge nozzle of the dispensing device. Actuation of the trigger advances a piston in a forward direction to expel either viscous or semi-viscous material from a forward discharge chamber of the dispensing device by decreasing the volume of the forward chamber and increasing the pressure therein, and to subsequently draw additional material into the discharge chamber through the creation of a partial vacuum as the chamber volume expands when the piston retracts into its relaxed position as a result of a resilient bias applied thereon. Material remaining in the forward nozzle and not discharged therefrom during the forward discharge stroke of the piston is drawn back into the forward discharge chamber around a displaceable flap covering a forward outlet opening in the discharge chamber. The flap is displaced by the partial vacuum created as a result of the rearward return movement of the piston towards its relaxed operating position, thereby avoiding the undesirable accumulation of non-discharged residual material in the discharge nozzle and the resulting continuous discharge of dripping material after the piston has completed its forward discharge stroke. Accordingly, both the discharge of material from the discharge chamber during the forward piston stroke and the reloading of the discharge chamber (including both the forward evacuation of material from the rearwardly disposed supply container, and rearward evacuation of any residual material remaining in the forward discharge nozzle from the previous discharge stroke) during the return piston stroke, is accomplished by a system which is primarily vacuum driven as a result of the creation of pressure differentials in the discharge chamber.

The dispensing device of the present invention is adapted to discharge precisely measured quantities of viscous or semi-viscous material, preferably relatively small quantities of insecticide or pesticide, in a repeatable sequence. The dispensing device employs structure and and operative relationship of structure, including an adjustable volume discharge chamber with a cooperating rear valve and forward flap, to both discharge precisely measure small quantities of viscous or semi-viscous materials, and to automatically reload the discharge chamber by evacuation of material from the rearwardly positioned liquid reservoir and by simultaneous evacuation of non-discharged material from the forwardly positioned discharge nozzle. Although the dispensing device of the present invention is intended to apply relatively small quantities of viscous or semi-viscous insecticide or pesticide, it is nonetheless within the scope of the invention to use the device for applying materials other than insecticides or pesticides.

DETAIL DESCRIPTION OF THE PREFERRED EMBODIMENTS OF THE INVENTION

The structure and operation of a dispensing device in accordance with the present invention will now be described in greater detail with respect to the accompanying drawing figures.

Figure 1:
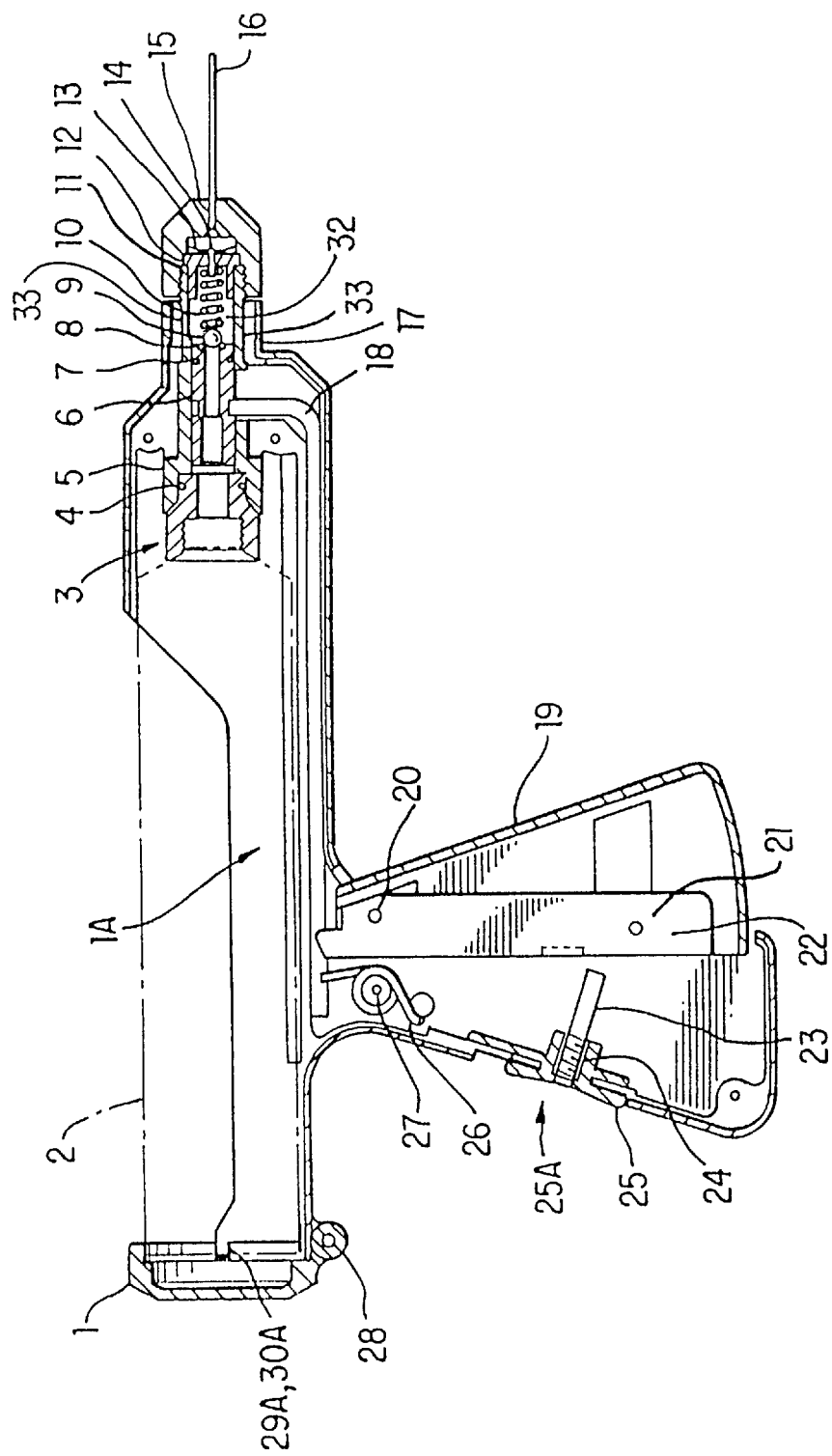
FIG. 1 of the drawing illustrates a sectional view of a dispenser gun in accordance with the present invention.

FIG. 1 of the drawing illustrates the preferred embodiment of a dispenser device for viscous or semi-viscous liquids in accordance with the present invention. The dispensing device includes a longitudinally extending housing section generally designated by the reference numeral 1A, a rear end cap 1 pivotably mounted to the rear of the housing 1A for removably mounting a reservoir 2 containing a viscous or semi-viscous liquid material to the housing 1A, and a handle section generally designated by reference numeral 25A extending downwardly from the lower surface of the housing 1A. A discharge needle 16 defining a discharge opening at the forwardmost end thereof extends from a nozzle cap 15 mounted to the forwardmost end of the dispenser housing 1A.

An adapter 3 and an adapter O-ring 4 are provided as part of the forward assembly of the discharge end of the removably mounted liquid containing reservoir 2. A cylinder 5 surrounds the O-ring 4 to firmly maintain a sealing engagement of the discharge end of the product reservoir container 2. A hollow piston 6 defining a centrally disposed bore extending therethrough is mounted forward of the discharge end of the reservoir 2, and the bore of the piston is in substantial axial alignment with the tapered discharge end of the reservoir 2. In this manner, as will be discussed in greater detail below, liquid from the reservoir 2 flows from the discharge opening in the reservoir in a substantially straight or longitudinal path directed forwardly into the centrally disposed bore defined in the piston. A portion of an outer surface of the piston 6 defines a notch or recessed section for receiving the remote end of a steel trigger bar 18. As will also be discussed in greater detail below, the coupling of the trigger bar 18 to the piston enables selective movement of the piston upon actuation of the trigger to discharge material from the forward needle 16 of the dispensing gun.

A pair of piston O-rings 7 are disposed around the outer surface of the piston 6 to provide sealing engagement therewith. The forward end of the centrally disposed bore defined within the piston 6 terminates in a check valve 9 which includes an O-ring 8 to enhance the sealing integrity of the valve. The check valve 9 includes a longitudinally extending spring 10 which exerts a resilient force on the ball valve 9 to maintain the valve in a sealing relationship against the forward opened end of the centrally disposed, longitudinally extending bore defined within the piston 6. Accordingly, the spring 10, in its relaxed normal operating position, will maintain the check valve in a closed position to seal the forward end of the bore defined in the piston.

A forward discharge chamber 32 is defined between a pair of opposed, longitudinally extending sidewalls 33 fixedly mounted relative to the housing 1A. The rear end of the discharge chamber is defined by the forward end of the piston 6, including the ball valve 9 seated in the forward discharge end of the bore defined within the piston. The forward end of the discharge chamber is defined by a flap valve assembly comprising a flap housing 12 and a flap element 13 movably secured to the forward end of the flap housing 12 and adapted to selectively cover one or more bores defined in the forward end of the flap housing and extending therethrough in fluid communication with the discharge chamber 32. The flap is mounted to the forward surface of the flap housing by a rivet 14. The forward assembly of the dispensing device further comprises a collar 17 mounted around a portion of the tapered forward end of the housing section 1A, and a nozzle cap 15 extending forward of the collar 17 and providing means for mounting the discharge needle 16 therein such that the discharge needle is in substantial alignment with the substantially axially directed flow of material from the forward discharge chamber 32, as will be discussed in greater detail below.

The handle section 25A of the dispensing gun generally comprises a downwardly extending handle 25 fixedly mounted relative to the longitudinally extending housing 1A. A movable trigger section 19 is pivotably mounted relative to the handle section 25 by a pivot pin 20. Relative movement of the trigger 19 towards the handle 25 results in forward movement of the trigger bar 18 to advance the piston 6 which is coupled to the trigger bar in the manner previously described herein. A trigger spring 26, which is mounted to the handle section 25 by means of mounting screws 27, resiliently biases the trigger 19 away from the handle section 25. Accordingly, when manual pressure is released from the trigger section 19, the trigger spring 26 causes movement of the trigger 19 away from the handle section 25, which in turn causes the piston bar 18 to retract the piston 6 rearwardly in the housing section 1A to supplement the resilient force also applied in a rearwardly direction to the piston 6 by the spring 10 as previously discussed.

Still referring to FIG. 1 of the drawing, the handle section 25 includes a threaded insert 24 directed into the handle for receiving an adjustment screw 23 in an opening defined in the insert. The adjustment screw cooperates with a trigger stop 22 fixedly mounted on the trigger 19 and pivotably movable therewith, to adjust the maximum permitted range of movement of the trigger section 19 relative to the handle section 25 to control the quantity of material discharged from the dispensing gun by controlling the extent of movement of the piston 6 into the discharge chamber 32.

Figure 2:
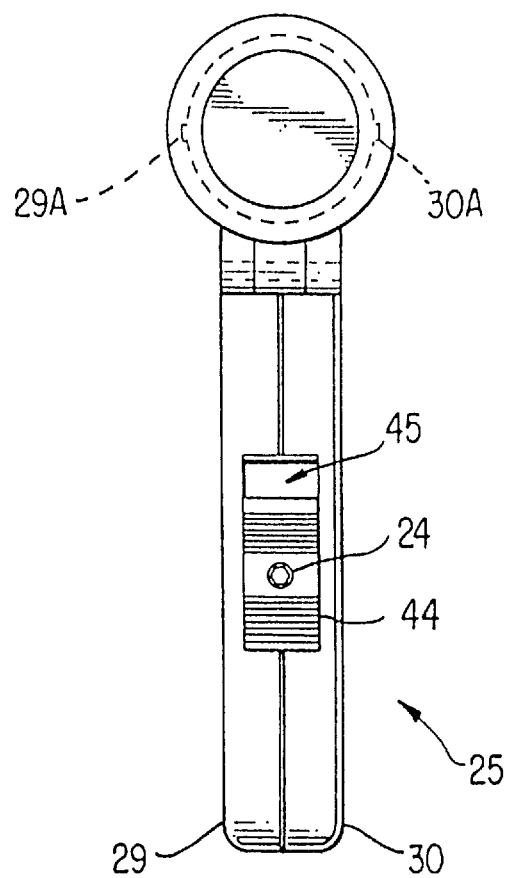
FIG. 2 of the drawing illustrates the forward portion of a discharge chamber of the dispenser gun shown in FIG. 1.
Figure 3:
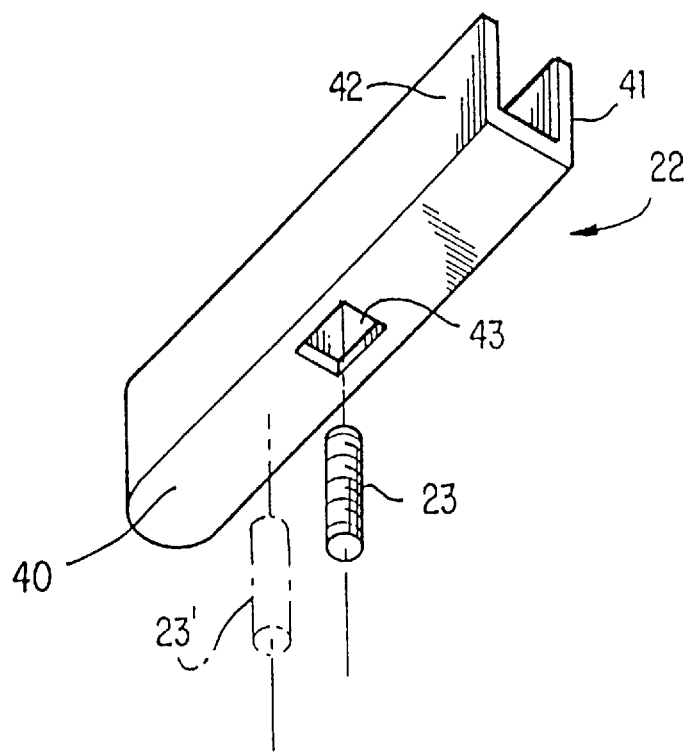
FIG. 3 of the drawing illustrates, in perspective, a portion of the handle section of the dispenser gun which acts as an adjustable stop element for metering the quantity of material to be discharged from the dispensing device upon actuation of a trigger element.

As more fully illustrated by FIG. 3, the trigger stop 22 is formed from a substantially U-shaped bar having a middle section 40 and two opposed sidewalls 41 and 42. An opening 43 is defined in the approximate center of the middle section 40 of the stop element 22. The opening 43 is sufficiently large to receive therethrough the adjustment screw 23 extending into the handle section 25 when the trigger is moved relative to the handle and the adjustment screw is aligned with the opening 43 in the trigger stop 22. When such alignment occurs, the trigger is movable through its maximum range relative to the handle. When more restrictive movement is desired, the insert 24 is movable relative to the handle 25 and the trigger stop 22 such that the opening 43 is no longer in alignment with the adjustment screw 23 extending into the handle. (The manner in which the insert 24 is movable relative to the trigger stop 22 is further described in the discussion of FIG. 2). When the screw and opening are out of alignment, relative movement of the trigger towards the handle is impeded by the screw which abuts against a closed surface portion of the middle section 40 of the trigger stop 22, as illustrated by the reference numeral 23' in FIG. 3. The extension of the screw 23 into the handle section 25 is variable so as to adjust the range of relative movement between the trigger and the handle before said relative movement is stopped by the abutment of the forward end of the screw 23 against the stop 22. In this manner, the quantity of material discharged from the dispensing device is variable by adjusting the range of maximum relative movement between the trigger and the handle which directly corresponds to the forward movement of the piston 6 in the housing 1A which also corresponds to the quantity of material discharged from the discharge chamber 32. Accordingly, the predetermined quantity of material to be discharged from the dispensing gun is controlled and selectively adjusted as a result of cooperation between the position of the trigger stop 22 relative to the insert 24 on the handle 25, and also the distance which the adjustment screw 23 extends into the handle section 25.

Referring to FIG. 2 of the drawing, a rear elevational view of the dispensing gun is illustrated partially in section. The handle 25 is formed from two separate halves 29 and 30 which are mated together by conventional means such as the collar 17 illustrated in FIG. 1. A rectangular opening 45 is defined generally in the center of the handle 25. A slide element 44 is movable within the opening 45, and the slide 44 carries the threaded insert 24 for receiving the adjustment screw 23 (See FIG. 1). Accordingly, movement of the slide element 44 in the opening 45 relative to the handle section 25 correspondingly moves the threaded insert 24 and the adjustment screw received therein, selectively into and out of alignment with the opening 43 in the trigger stop 22 (See FIG. 3). As previously discussed, axial alignment and non-alignment of the adjustment screw 23 carried by the handle 25 with the opening 43 in the trigger stop 22 carried by the trigger 19 controls the maximum permitted range of relative movement between the trigger 19 and the handle 25.

Still referring to FIG. 2, the housing 1A removably receives a product container tube 2 when the rear end cap 1 hingedly mounted to the rear of the housing is pivoted into an open position. The housing defines two opposed extensions 29A and 30A for removably receiving complementary configured grooves in hinged cap 1. The complementary configured extensions and grooves assure a firm friction fit between the hinged cap 1 and the housing 1A. The product container 2 is then removably received within housing 1A and the hinged cap 1 is pivoted into its closed position as illustrated in FIG. 1.

The operation of the dispensing gun in accordance with the present invention will now be discussed with reference to FIGS. 1 and 4 of the drawing. Referring first to FIG. 1, actuation of the trigger 19 by manual movement thereof towards the handle 25, against the bias of trigger spring 26, causes forward movement of the trigger bar 18. The trigger bar is coupled to the piston 6, as previously described, such that advancement of the trigger drives the piston forward in the housing in a direction towards the discharge needle 16. More specifically, as the piston 6 advances forward into the discharge chamber 32, the forward end of the bore extending through the piston is sealed as a result of the resilient force applied on a check valve 9 by a valve spring 10 to seat a ball on the discharge end of the bore to seal the forward end of the bore defined in the piston adjacent to the discharge chamber 32. Forward movement of the piston into the discharge chamber 32 decreases the volume of the chamber, thereby increasing the pressure therein, to force material within the chamber forwardly through a plurality of discharge ports 50 and 52 (illustrated by FIG. 4) defined in the outlet end of the discharge chamber. The material flows through the discharge needle 16 and is discharged from the dispensing gun and applied to a predetermined target area. As previously discussed, the relative movement of the trigger 19 towards the handle 25 is adjustable to control the forward movement of the piston 6 into the discharge chamber 32, thereby controlling the quantity of material discharged from the dispensing gun in response to actuation of the trigger.

Figure 4:
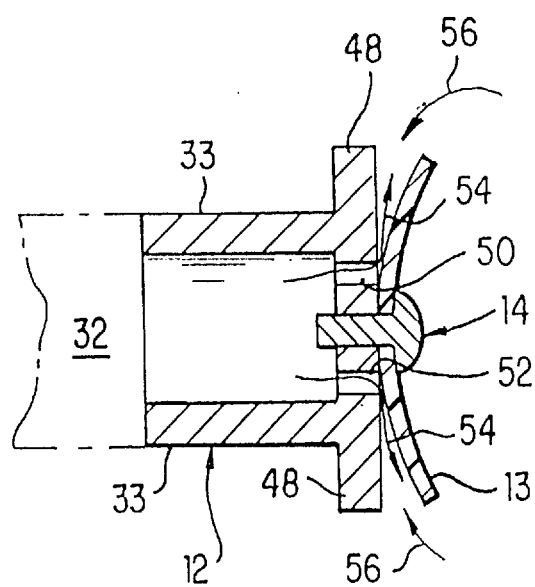
FIG. 4 of the drawing illustrates a rear elevational view, in section, of the dispensing gun shown in FIG. 1 illustrating a removable reservoir retained within the housing and an adjustment element on the handle section for setting a predetermined quantity of material to be discharged from the dispenser gun upon actuation of the trigger of the gun.

FIG. 4 of the drawing illustrates the forward outlet end of the discharge chamber 32 in greater detail. A forward discharge end wall 48 defines at least one discharge port (50, 52). A displaceable flap 13 is mounted to the outer surface of the forward end wall 48 by a rivet 14, and preferably at least one discharge outlet port (50, 52) is disposed on each side of the rivet 14. The flap housing 12, as illustrated in FIG. 1, defines the discharge chamber 32 between the opposed sidewalls 33 and the forward end wall 48. The flap is formed from a pliable material, preferably a latex material, having a thickness in the order of $\frac{1}{30,000}$ inch. As the pressure in the discharge chamber 32 is increased by the forward movement of the piston 6, the material within the discharge chamber 32 is forced to flow forwardly through the outlet ports (50, 52) in the end wall 48, displacing the portions of the flap 13 covering the ports, so that the material is discharged through the outlet ports. The discharged material flows through the ports and into the forward needle 16, to be discharged from the dispensing gun.

After a predetermined quantity of material has been discharged from the dispensing gun as described above (the quantity of discharged material having been preselected as a result of adjustment of the trigger control means previously discussed herein), the trigger 19 is forced to move in a direction away from the handle 25 as a result of the resilient force applied to the trigger by the trigger spring 26. The relative movement of the trigger in a direction forwardly away from the handle 25 causes the trigger bar 18 to be retracted in a direction towards the rear of the longitudinally extending housing 1A. The rearwardly retracted movement of the trigger bar causes rearward movement of the coupled piston 6 relative to the discharge chamber 32. The rearward movement of the piston 6 is further supplemented by the resilient force applied by the valve spring 10 on the forward end of the piston 6 as the valve spring returns to its relaxed position. As the piston 6 is moved in a rearward direction, the discharge chamber 32 increases in volume, thereby decreasing the pressure therein. As a result of the reduced pressure in the discharge chamber 32, suction is generated drawing material from the discharge outlet of the rearwardly disposed product container tube 2 forwardly through the bore in the piston 6, and into the forward discharge chamber 32. The forward flow of material through the bore in the piston as a result of the reduced pressure in the discharge chamber causes displacement of the ball valve 9 from the valve seat to unseal the forward discharge end of the bore in the piston to permit flow of material from the bore and into the forward discharge chamber. Simultaneously with the forward flow of material from the rearwardly disposed product container tube 2, residual material which may still remain in the discharge needle 16 (or in other positions forward of the discharge chamber 32) is drawn rearwardly into the discharge chamber 32 as a result of the decreased pressure within the discharge chamber. The material drawn rearwardly displaces the flap 13 so as to enter the discharge chamber 32 through the ports 50 and 52. Directional arrows 54 of FIG. 4 illustrate the forward flow of material out from the discharge ports (50, 52) towards the forward needle 16, while directional arrows 56 illustrate the path of fluid flow of material from the discharge needle back into the discharge chamber 32 through the ports (50, 52). In both directions of flow, the pressure differential in the discharge chamber causing the flow of material also displaces the flap 13 to open the ports (50, 52) to enable flow of material through the ports both into and out of the discharge chamber 32. Accordingly, the decreased pressure in the discharge chamber 32 resulting from the rearward movement of the piston 6 reloads the discharge chamber with material to be subsequently discharged from the dispensing gun by both drawing material forwardly from the rearwardly disposed product container 2, and simultaneously drawing residual material remaining in the needle 16 rearwardly back into the discharge chamber 32. The rearward flow of residual material also serves to prevent dribbling or dripping of this material from the needle to assure that only precisely measured quantities of material are applied during the discharge phase of the dispensing gun only when the trigger is actuated by the user.

It is apparent from the above discussion that the dispensing gun in accordance with the present invention is a vacuum driven system which is adapted to efficiently discharge and deliver precisely metered, pre-selected quantities of material to be applied to a target area in repeatable sequences. The system is designed to operate primarily on pressure differentials generated within the dispensing apparatus, causing fluid flow in a substantially linear direction through the gun housing. The dispensing gun includes cooperating structure for automatically reloading the discharge chamber for subsequent discharge of material, said reloading occurring simultaneously from a rearwardly disposed product reservoir container, and from forwardly disposed residual material remaining in the device from a prior discharge procedure. The residual material drawn back into the discharge chamber from the forward discharge needle of the device acts to prevent dripping or dribbling of this material from the dispensing device after a discharge sequence. In this manner, precise and preselected quantities of material will be delivered from the dispensing device during a subsequent discharge operation. A displaceable flap is provided to removably cover at least one outlet port defined at the forward end of the discharge chamber by cooperating with increased and decreased pressure generated in the discharge chamber by advanced and retracted movement of the discharge piston in response to actuation of the trigger.

Preferably, the dispensing gun is designed to deliver precisely metered materials in quantities as small as 0.007 grams in repeatable sequences. The adjustment means for controlling the range of relative movement between the trigger and the handle of the dispensing gun to preselect the quantity of material to be discharged from the dispensing gun, assures that materials will be discharged from the dispensing gun in the same preselected quantities in repeatable sequences, as is desired by the user. The control means also enables adjustment of the preselected quantity of material to be discharged during actuation of the trigger, at the selection of the user. The dispensing gun is designed such that relatively large movements of the trigger relative to the handle are translated into relatively small displacements of the piston into the discharge chamber to enable the precise discharge of small quantities of product. The dispensing device is also designed such that flow of material through the dispensing housing is substantially linear to promote efficient discharge of material from the vacuum driven device. Although the device is primarily adapted to discharge viscous and semi-viscous material including pesticides and insecticides, it may nonetheless be used for dispensing other types of material.

Other modifications and advantages of the dispensing gun within the scope of the present invention will become apparent to those skilled in the art. Accordingly, the discussion of the preferred embodiments of the invention herein is intended to be illustrative only, and not restrictive of the scope of the invention, that scope being defined by the following claims and all equivalents thereto.

I claim:

1. A device for discharging material from a housing in response to actuation of a trigger, said device including the housing, the trigger, and a handle extending from said housing, the trigger being selectively movable relative to said handle, and means for discharging a preselected quantity of material from said housing in response to predetermined movement of said trigger relative to said handle; said device including means for adjusting the range of movement of said trigger relative to said handle for varying the quantity of material to be discharged from said housing, said means for adjusting including an insert on said handle, said insert adapted to receive an adjustment member extending into said handle through an opening defined in said insert, said insert including means for adjusting the distance which said adjustment member extends into said handle, and a trigger stop mounted to said trigger and movable therewith such that said trigger stop abuts against a forward end of said adjustment member to limit movement of said trigger relative to said handle, said trigger stop defining an opening therein, and means for selectively adjusting the position of said adjustment member extending into said handle such that said adjustment member is in or out of alignment with said opening, wherein said maximum movement of said trigger relative to said handle is permitted when said adjustment member is aligned with said opening in said trigger stop and said adjustment member is received within said opening.

2. The device as claimed in claim 1 further including means for exerting a resilient force on said trigger in a direction away from said handle such that movement of said trigger towards said handle is against a resilient bias.

3. The device as claimed in claim 1 wherein said insert means is carried on a base movably mounted relative to said handle for adjusting the position of said insert and said adjustment member extending therethrough relative to said opening defined in said trigger stop carried by said trigger for selectively aligning said adjustment member with said opening in said trigger stop.

4. The device as claimed in claim 3 wherein said adjustment member is an adjustment screw, and said insert is a threaded socket, wherein the distance which said adjustment member extends into said handle is adjustable.

5. A device for discharging a liquid material, said device including a housing, a handle extending from said housing, a trigger mounted to said handle and selectively movable relative thereto, and means for coupling said trigger to a movable piston in said housing for selectively advancing and retracting the relative position of said piston in said housing; a discharge chamber operatively associated with said housing and located proximate to a forward end thereof, and said piston being selectively movable into and out of said discharge chamber in response to actuation of said trigger; said piston defining a central bore therein for providing fluid communication between a product reservoir disposed rearwardly of said piston and said discharge chamber defined forwardly of said piston; valve means disposed on an end of said bore in said piston adjacent to said discharge chamber; said discharge chamber defining outlet means in a forward end thereof; wherein forward movement of said piston into said discharge chamber increases the pressure within said chamber to discharge material therein through said outlet means, and retraction of said piston in a direction rearwardly relative to said discharge chamber decreases the pressure within said chamber to result in flow of material in a forward direction through said bore in said piston from said rearwardly disposed product reservoir and into said forwardly disposed discharge chamber, and retraction of said piston simultaneously results in rearward flow of material positioned forward of said discharge chamber through said outlet means for reloading said discharge chamber for subsequent discharge of material therefrom; said device further including an end cap pivotably mounted to a rear portion of said housing, said end cap being pivotal between an opened and a closed position for removing and receiving said product reservoir in said housing.

6. The device as claimed in claim 5 wherein said housing includes at least one extension receivable in at least one complementary configured groove defined in said end cap for retaining said end cap in said closed position on said housing to provide a friction fitting engagement between said end cap and said housing when said product reservoir is removably received in said housing.

* * * * *